United States Patent
Foster et al.

(10) Patent No.: US 6,486,906 B1
(45) Date of Patent: Nov. 26, 2002

(54) APPARATUS AND METHOD FOR PRINTHEAD TO MACHINE SKEW AND MARGIN ADJUSTMENT FOR AN ELECTROPHOTOGRAPHIC MACHINE

(75) Inventors: Larry Steven Foster, Lexington, KY (US); David Anthony Schneider, Lexington, KY (US); Earl Dawson Ward, II, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 27 days.

(21) Appl. No.: 09/660,959

(22) Filed: Sep. 13, 2000

(51) Int. Cl.⁷ .............................. B41J 2/435; B41J 15/01
(52) U.S. Cl. ........................ 347/234; 347/248; 347/116
(58) Field of Search ................................ 347/116, 118, 347/154, 232, 233, 234, 235, 248, 250

(56) References Cited

U.S. PATENT DOCUMENTS

| | | | |
|---|---|---|---|
| 4,937,664 A | 6/1990 | Chiku et al. | 358/526 |
| 5,072,244 A * | 12/1991 | Aoki et al. | 347/116 |
| 5,121,145 A | 6/1992 | Buch et al. | 347/118 |
| 5,272,493 A | 12/1993 | Hubble, III et al. | 347/116 |
| 5,363,127 A | 11/1994 | Andrews | 347/134 |
| 5,374,993 A | 12/1994 | Diehl et al. | 358/300 |
| 5,384,621 A | 1/1995 | Hatch et al. | 399/42 |
| 5,418,556 A | 5/1995 | Andrews | 347/116 |
| 5,694,637 A | 12/1997 | Yoshino et al. | 399/38 |
| 5,982,402 A * | 11/1999 | Yoshikawa et al. | 347/116 |
| 6,002,413 A | 12/1999 | Nishizawa et al. | 347/116 |
| 6,335,747 B1 * | 1/2002 | Munakata | 347/116 |

* cited by examiner

*Primary Examiner*—Hai Pham
(74) *Attorney, Agent, or Firm*—Ronald K. Aust

(57) ABSTRACT

A method of aligning a laser printhead in an electrophotographic machine includes providing a fixture with a pair of fixed sensors. The fixed sensors are spaced apart along a length of a first fixture drum axis. Each of the fixed sensors is fixed relative to a second of the fixed drums. The first fixture drum is provided with a pair of floating sensors. The floating sensors are spaced apart along the length of the first fixture drum axis. Each of the floating sensors is fixed relative to the first fixture drum. A laser beam from the laser printhead is scanned across an outside surface of the first fixture drum, the fixed sensors and the floating sensors. An intersection of the scanned laser beam and the outside surface of the first drum defines a scan path. A first skew of the scan path relative to an axis of the first drum is measured using the floating sensors. A second skew of the scan path relative to an axis of the second drum is measured using the fixed sensors. The scan path of the laser beam is adjusted dependent upon each of the first skew and the second skew.

41 Claims, 4 Drawing Sheets

APPARATUS AND METHOD FOR PRINTHEAD TO MACHINE SKEW AND MARGIN ADJUSTMENT FOR AN ELECTROPHOTOGRAPHIC MACHINE

BACKGROUND OF THE INVENTION

1. Field of the Invention

The present invention relates to an electrophotographic machine, and, more particularly, to a method of aligning a laser printhead in an electrophotographic machine such as a tandem color laser printer.

2. Description of the Related Art

An electrophotographic machine such as a tandem color laser printer requires four individual laser scanner printheads to independently and simultaneously image a specific color on each of four respective photoconductive drums. In an in-line color electrophotographic imaging process, latent images are formed on the photosensitive drums, and the images are in turn developed using a predetermined color of toner. All four of these toner images are then transferred simultaneously onto a transfer medium, such as a belt. The developed images are then transferred to a sheet of media (such as paper) which travels past the transfer medium. The image in each color is created one line at a time, and the lines are oriented at right angles to the direction of travel of the sheet of media. The individually generated images combine to form a full-color image. In a typical multi-color laser printer, for example, the transfer medium passes through four color developing stations in series, with the colors being yellow, cyan, magenta and black.

It is recognized that in order for the multi-color laser printer to print accurately, the laser beams for all four colors must be in alignment, both in the scan direction (across the page) and the process direction (feed direction of the print medium). However, providing proper alignment of even a single laser printhead in relation to the sheet of media in the process direction can be difficult. This problem is compounded with the addition of each printhead, since the plurality of printheads must be in registration so that the individual images generated by each printhead can be superimposed correctly when combined. During printer assembly an attempt is made to optically align the laser printheads both individually and collectively, but the ability to provide precise alignment is limited by several factors, including component tolerances.

What is needed in the art is a method of quickly and accurately achieving skew adjustment and margin alignment in an electrophotographic machine.

SUMMARY OF THE INVENTION

The present invention provides a fixture to achieve the skew adjustment and the margin alignment of all four color planes to the accuracy required for high quality color printing with minimum operator interaction in a production environment.

The invention comprises, in one form thereof, a method of aligning a laser printhead in an electrophotographic machine having a plurality of photoconductive drums. A first of the photoconductive drums is replaced with a drum fixture containing a pair of fixed sensors located where the image plane of the laser beam would intersect the drum. The fixed sensors are spaced apart along a length of the first photoconductive drum axis. Each of the fixed sensors is fixed relative to a second of the photoconductive drum axes. The first photoconductive drum fixture is also provided with a pair of floating sensors. The floating sensors are spaced apart along the length of the first drum fixture. Each of the floating sensors is fixed relative to the first photoconductive drum fixture, but this photoconductive drum fixture floats relative to the second photoconductive drum axis. A laser beam from the laser printhead is scanned across an outside surface of the first drum fixture, the fixed sensors and the floating sensors. An intersection of the scanned laser beam and the outside surface of the first drum defines a scan path. A first skew of the scan path relative to an axis of the first photoconductive drum is measured using the floating sensors. A second skew of the scan path relative to an axis of the second photoconductive drum is measured using the fixed sensors. The scan path of the laser beam is adjusted dependent upon each of the first skew and the second skew.

The invention comprises, in another form thereof, an electrophotographic machine including a plurality of photoconductive drums. A laser printhead scans a laser beam across a fixture in the location of a first of the photoconductive drums. A pair of fixed sensors are spaced apart along a length of the first photoconductive drum axis. The fixed sensors are fixed relative to a second of the photoconductive drum axes. The fixed sensors sense a skew of the laser beam relative to the second photoconductive drum axis. A pair of floating sensors are spaced apart along the length of the first photoconductive drum fixture. The floating sensors are fixed relative to the first photoconductive drum fixture. The floating sensors mounted to the first drum fixture sense a skew of the laser beam relative to the first photoconductive drum axis. A processing/feedback unit is in communication with the fixed sensors and with the floating sensors. The processing/feedback unit calculates a desired skew of the laser beam and provides an indication of a desired skew target.

The assembly and alignment of a tandem color laser printer requires that the line created by the intersection of the plane of the laser scan and the surface of the photoconductive drum cause the image when transferred to the transfer medium to be parallel to the image of the reference photoconductive drum (usually the black drum). This reference photoconductive drum (black) datum is chosen as the datum for parallel transferred images. Thus, the black laser scan is aligned parallel to this black reference photoconductive drum datum axis just as is done in a single color (mono) laser printer. The other laser scans are aligned skewed with their respective photoconductive drum datum axis in an amount equal to the skew between their respective photoconductive drum datum axis and the black reference photoconductive drum datum axis. Thus, each of the non-black color laser scans will be adjusted to have twice the skew relative to the black laser scan (or to the black reference photoconductive drum datum axis) that its respective color photoconductive drum datum axis has compared to the black reference photoconductive drum datum axis. This implies that the skew in each photoconductive drum datum axis relative to the black reference photoconductive drum datum axis must be measured with the adjustment fixture of the present invention. The adjustment fixture must also measure the skew in the respective laser scan relative to its respective photoconductive drum datum axis.

It is desired to adjust the skew of the image generated by each printhead relative to the black reference photoconductive drum datum axis to within 0.015 mm over the 215.9 mm (8.5 inch) writing line length. This is achieved by adjusting the mechanical position of the printhead relative to its respective photoconductive drum datum axis during the assembly process. The printhead is designed with a coarse adjustment and a fine adjustment feature that can allow this precise skew adjustment to be achieved. The assembly operator receives easy to use feedback which provides the required target to achieve the desired skew adjustment and the instantaneous status of the laser scan relative to this desired target.

The assembly and alignment of a tandem color laser printer also requires aligning other registration characteristics of the four transferred images. The adjustment fixture of the present invention provides data to the printer that allows the printer to electronically adjust the left-right margin locations for all four colors to an equal nominal location, adjust the line lengths of all four colors to be equal, and adjust the relative timing of imaging each color to correct for the process direction spacing of each photoconductive drum datum axis relative to the black photoconductive drum datum axis. These three settings are then stored in the printer NVRAM ready for customer use.

An advantage of the present invention is that, in a production environment, an assembly operator can quickly achieve the skew adjustment and margin alignment of all four color planes that is required for high quality color printing.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
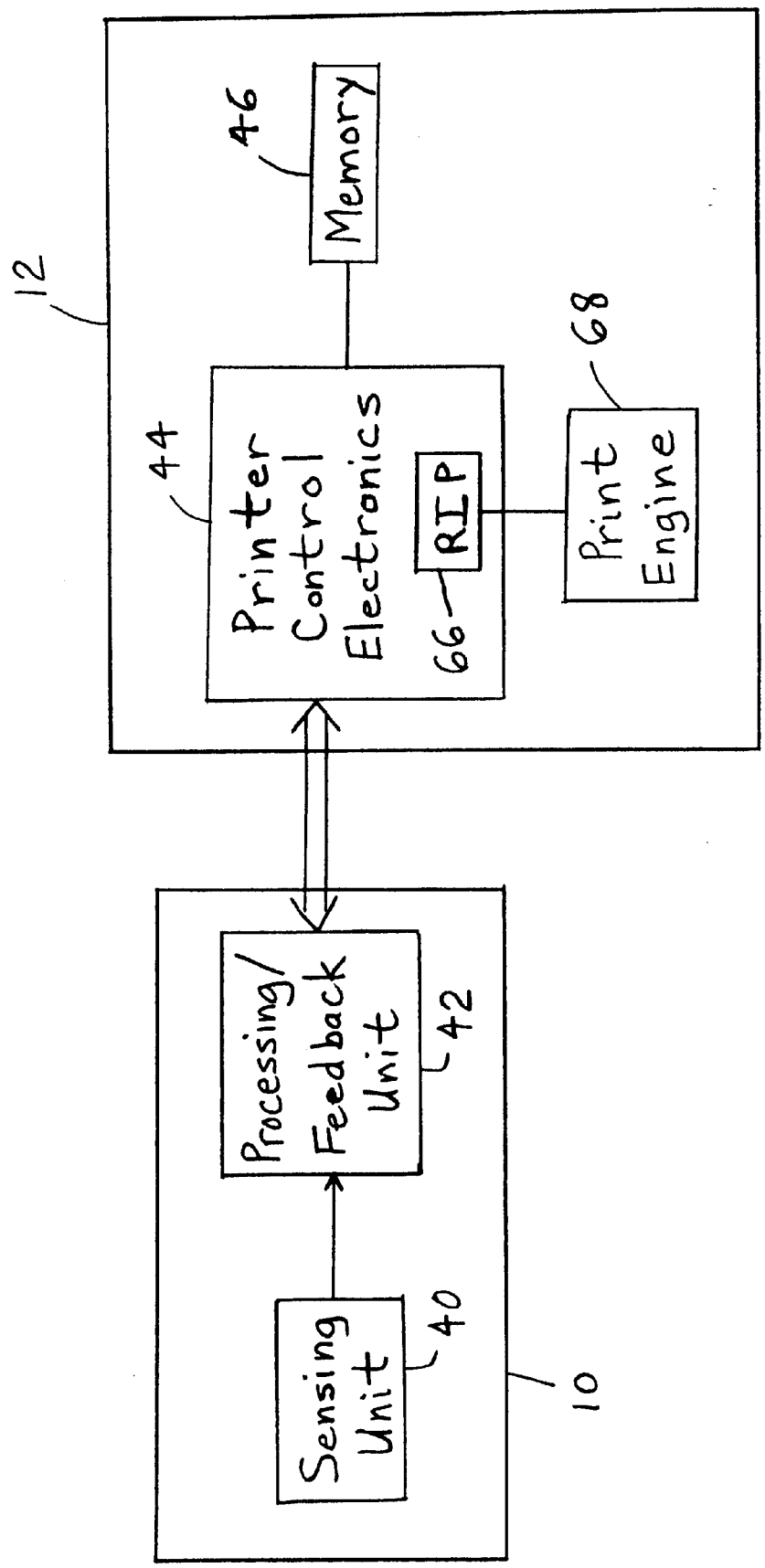
FIG. 1 is a block diagram of one embodiment of an alignment fixture of the present invention interacting with a laser printer.

Referring now to the drawings and, more particularly, to FIG. 1, there is shown one embodiment of an adjustment fixture 10 of the present invention interacting with a multi-color laser printer 12.

Figure 2:
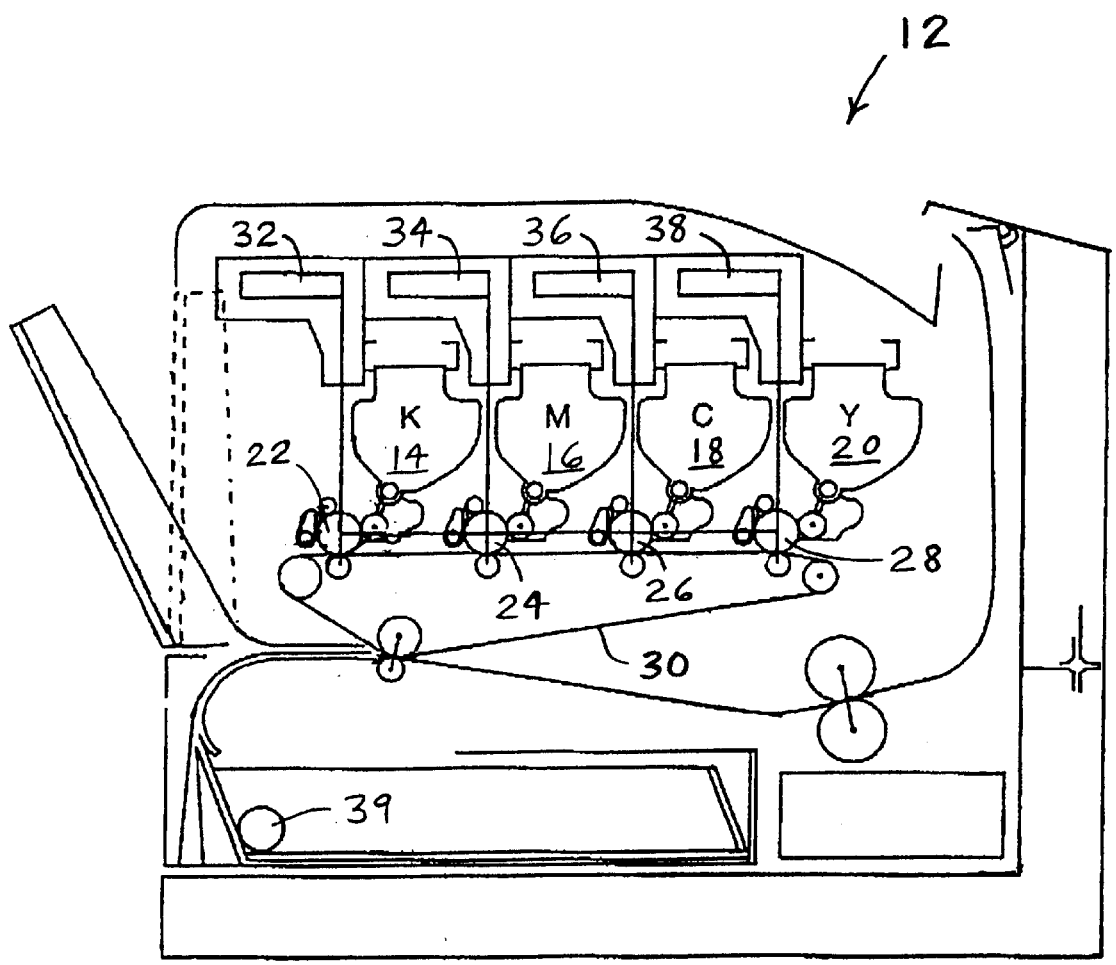
FIG. 2 is a schematic diagram of the fixture drums and the laser printer of FIG. 1.

Printer 12 includes a black toner cartridge 14 (FIG. 2), a magenta toner cartridge 16, a cyan toner cartridge 18 and a yellow toner cartridge 20 with corresponding photoconductive drums 22, 24, 26 and 28. Each drum 22, 24, 26 and 28 engages a transfer belt 30. Each of printheads 32, 34, 36 and 38 scans a respective image onto a respective one of photoconductive drums 22, 24, 26 and 28. A paper drive motor 39 moves paper into engagement with transfer belt 30.

Adjustment fixture 10 includes a sensing unit 40 and a processing/feedback unit 42 in bi-directional communication with control electronics 44 of printer 12. Sensing unit 40 is placed inside laser printer 12 in the space that is normally occupied by the four printer cartridges 14, 16, 18 and 20. Sensing unit 40 registers itself to each corresponding datum axis of photoconductive drums 22, 24, 26 and 28. Sensing unit 40 then detects the skew between each datum axis of color photoconductive drums 24, 26 and 28 relative to the reference datum axis of black photoconductive drum 22 and feeds this information to processing/feedback unit 42. Sensing unit 40 also detects the location in both the scan and the process direction of a particular energized spot at each end of the writing line (215.9 mm apart) and feeds this information to processing/feedback unit 42.

Processing/feedback unit 42 is located on the assembly operator's bench external to printer 12. Processing/feedback unit 42 receives data from sensing unit 40, processes the data, and provides the assembly operator with a visual indication of the desired skew target for the particular printhead being mechanically adjusted and an interactive visual indication of the orientation of the scan line relative to this target.

Processing/feedback unit 42 also communicates with printer controls 44 to trigger printer 12 to generate the necessary laser patterns to enable the skew adjustment by the operator and also the necessary patterns to achieve the electronic alignments needed. Once printer 12 generates the desired patterns for the electronic alignment process, then sensing unit 40 gathers the data necessary to allow printer 12 to perform the desired electronic adjustments. Processing/feedback unit 42 then receives one or more sets of data from sensing unit 40 in order to confirm that the electronic adjustments made by printer 12 have indeed achieved the desired alignment results. This confirmation is communicated to printer controls 44 for final storage of the results in printer memory 46, which may be in the form of non-volatile random access memory.

Figure 3:
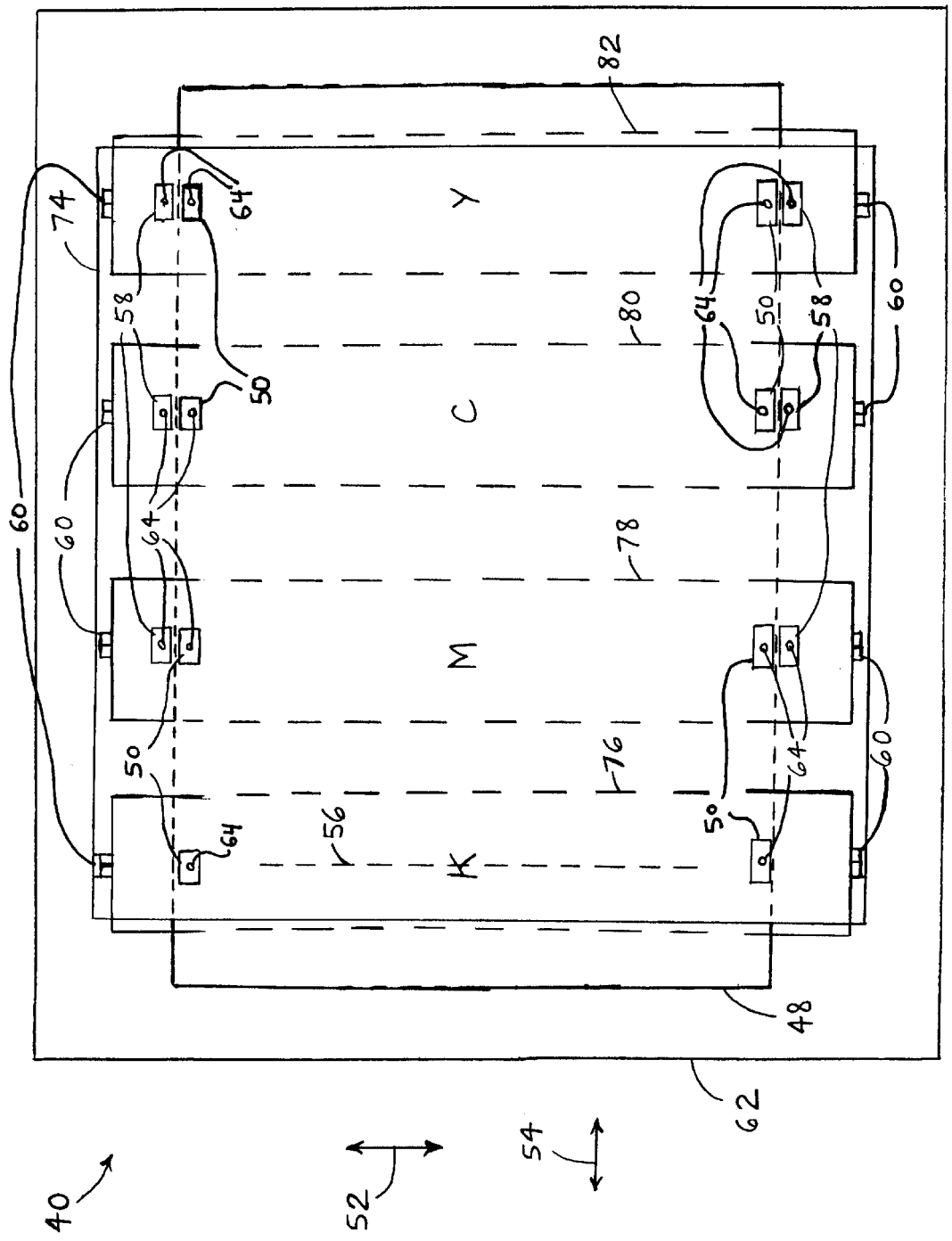
FIG. 3 is a partial top view of the alignment fixture of FIG. 1.

Sensing unit 40 includes a very rigid plate 48 (FIG. 3) that has a drum fixture 76 rigidly attached thereto. This rigid plate 48 includes a fixed sensor 50 at each end of each nominal photoconductive drum 22, 24, 26, 28 axis. These fixed sensors 50 detect in both the scan direction, indicated by double arrow 52, and the process direction, indicated by double arrow 54. Sensors 50 are rigidly fixed such that a line between a pair of sensors 50 that correspond to a same one of photoconductive drums 22, 24, 26, 28 is parallel to a V-block reference datum 56 (FIG. 4) of black photoconductive drum 22. That is, there are a total of eight fixed sensors 50, with each imaginary line that joins a corresponding one of the four pairs of fixed sensors 50 being parallel to black photoconductive drum datum 56. Sensors 50 are fixed relative to black photoconductive drum datum 56, and each is located as accurately as possible to either a 0 mm location or a 215.9 mm location at an end of a corresponding one of photoconductive drums 22, 24, 26, 28.

Sensing unit 40 also includes six floating sensors 58, each disposed at a corresponding end of a corresponding one of the non-black drum fixtures 78, 80 and 82. Sensors 58 are rigidly mounted to each one of the non-black drum fixtures 78, 80, 82 which float such that they each align with a corresponding V-block 60 of photoconductive drums 24, 26 and 28 when sensing unit 40 is lowered into place. Floating sensors 58 are located on the outboard side of, and as close as possible to, fixed sensors 50, which are fixed parallel to the black V-block reference datum 56. Each sensor 50, 58 can be in the form of a charged coupled device (CCD) array or a dual axis position sensitive diode, for example. The floating sensors 58 may also be located on the inboard side of fixed sensors 50.

The laser scan for each color is used as the light source that is measured by sensors 50, 58 on each end of the non-black drum fixtures 78, 80, 82. The difference in the process direction 54 values obtained between the two readings on one end and the two readings on the other end characterizes the skew of the photoconductive drum V-blocks 60 for that color relative to the black reference photoconductive drum datum 56. This information is then used to provide the operator with a target that is used to align the printhead for that non-black color. In the case of the black image printhead, only the fixed sensors 50 are used to align the black printhead to the black reference photoconductive drum axis.

After each printhead skew has been set, fixed sensors 50 are used to measure the location of the first and last dots or picture elements (PEL's) that form the scan line. Sensors 50 feed this location information to printer controller 44. The locations of the first and last PEL's are determined by imaging a line of nominal length (215.9 mm) across drum fixture 76 for example. At the start-of-scan end, if no beam is detected on sensor 50, then the scan line must be started earlier in order to pull the first PEL back onto sensor 50. More particularly, the number of counts that occur after the horizontal synchronization signal and before the start-of-scan must be reduced. On the other hand, if the scan line extends completely across sensor 50, then the scan line must be started later in order to push the first PEL onto sensor 50. More particularly, the number of counts that occur after the horizontal synchronization signal and before the start-of-scan must be increased. Once the start of the print line is on sensor 50, the location of this starting point is determined by the output of sensor 50.

A technique similar to the above technique of locating the start-of-scan PEL is used to detect the location of the end-of-scan PEL. If no scan line is detected on the sensor 50 that is disposed at the end-of-scan, then PEL slices are added in order to lengthen the scan line. On the other hand, if the scan line extends completely across the sensor 50 that is disposed at the end-of-scan, then PEL slices are removed in order to shorten the scan line.

Calibration is accomplished by mounting sensing unit 40 onto a very rigid calibration plate 62 which has the skew between photoconductive drum V-blocks 60 very accurately minimized. Thus, sensing unit 40 now has the ideal "no skew" condition set up between the photoconductive drum V-blocks 60. Next, a glass standard 74 is placed between a collimated light source and the sensors. Glass standard 74 has etched apertures 64 extending therethrough which are accurately aligned parallel to the black reference photoconductive drum V-blocks 60. Thus, the six sensors 58 that float with the V-blocks 60 for each of the non-black colors can be calibrated to the ideal "no-skew" values provided by the calibration fixture. Likewise, the eight sensors 50 that are fixed relative to the black photoconductive drum datum 56 are calibrated for the "no-skew" location parallel to the black photoconductive drum datum 56. In addition, the eight fixed sensors 50 use the etched apertures 64 on the glass reference standard 74 to establish the ideal scan direction 52 and process direction 54 locations for each color.

The test sequence is controlled by the alignment fixture processing/feedback unit 42. Processing feedback unit 42, when initialized by the operator mounting sensing unit 40 into printer 12 and connecting printer 12 to processing/feedback unit 42, communicates to a raster image processor (RIP) 66 in printer control electronics 44 to initiate the alignment sequence. Raster image processor 66 generates a special page to turn on a constant laser scan line (100% duty cycle) which scans the entire tip-to-tip distance. Raster image processor 66 then sends a request to print a diagnostic page to a print engine 68. Print engine 68 starts the page under the normal print sequence, but does not drive transfer belt 30, cartridges 14, 16, 18 20, the voltages on drums 22, 24, 26, 28, or paper drive motor 39.

Figure 4:
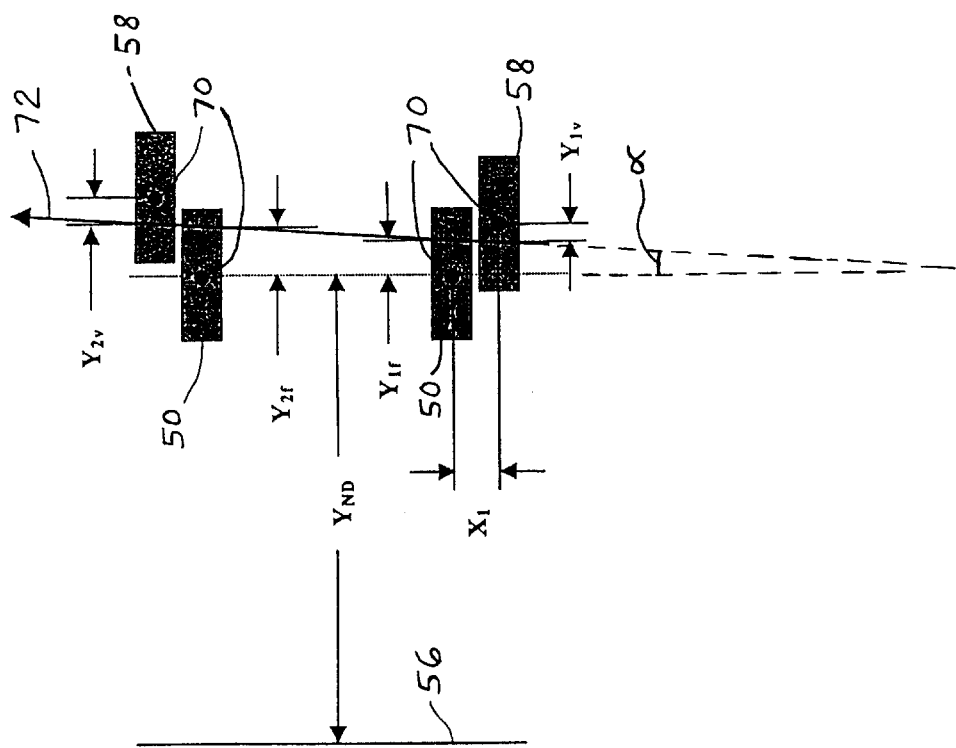
FIG. 4 is a schematic diagram of sensors of the alignment fixture of FIG. 1.

Dots 70 in FIG. 4 indicate the locations of the spots on sensors 50, 58 that were located through apertures 64 of glass reference standard 74. The path of the scan line, also referred to as a "scan path", produced by the laser beam is indicated by arrow 72. The alignment fixture processing/feedback unit 42 determines, at each end of each non-black color scan, the process direction distance from the nominal calibration spot, indicated by dot 70, to the centroid of the laser beam as it strikes fixed sensor 50. This distance is indicated by $Y_{1f}$ at the start-of-scan end and by $Y_{2f}$ at the end-of-scan end. Tester 10 also determines, at each end of each non-black color scan, the process direction distance from the nominal calibration spot 70 to the centroid of the beam as it strikes floating sensor 58. This distance is indicated by $Y_{1v}$ at the start-of-scan end and by $Y_{2v}$ at the end-of-scan end. "Y" values are considered to be positive if they are on the side of the nominal calibration point 70 that is away from the black photoconductive drum axis datum 56.

The calculated skew distance of the laser beam relative to fixed sensors 50 is:

$$D_f=(Y_{2f}-Y_{1f}).$$

The calculated skew distance of the laser beam relative to the V-block sensors 58 is:

$$D_v=(Y_{2v}-Y_{1v}).$$

As can be appreciated, if $D_v$ is nonzero, then scan path 72 is not linear in three dimensions. Rather, scan path 72 is slightly arcuate due to the cylindrical outer surface of the photoconductive drum.

The skew between a reference line through the V-blocks 60 of that particular color and the black reference photoconductive drum datum 56 is:

$$S_v=(D_f-D_v).$$

In a similar manner the skew can be found for each of the non-black color V-blocks 60 relative to the black V-block reference datum 56.

These measurements can also be corrected for the distance $X_1$ between fixed sensor 50 and floating V-block sensor 58. Distance $X_1$ is known from alignment fixture 62. An angle, $\forall$, of scan line 72 across fixed sensors 50 is:

$$\forall=tan^{-1}(D_f/215.9)$$

where $D_f$ is in mm to be consistent with the units of the 215.9 mm distance between fixed sensors 50. Thus, the predicted location of the laser beam on the V-block sensor 58 at fixed sensor 50 is:

$$Y'_{1v}=Y_{1v}+X_1 tan\forall=Y_{1v}+X_1*(D_f/215.9)$$

or $$Y'_{1v}=Y_{1v}+(X_1/215.9)*D_f$$

and $$Y'_{2v}=Y_{2v}-(X_1/215.9)*D_f$$

where $D_f$ is in units consistent with Y and $X_1$ is in mm. Clearly, this same technique works for distances between fixed sensors 50 that are different than the desired nominal print line distance of 215.9 mm. In a similar manner, all the $Y_{iv}$ can be corrected to $Y'_{iv}$ values projected onto the fixed sensor location. Using the laser beam itself with the algorithm described above corrects for the skew of the laser beam itself and separates out the desired information about the skew in V-blocks 60 alone.

Black printhead 32 is adjusted mechanically to be in line with the black photoconductive drum datum 56 using corresponding fixed sensors 50 located at each end of the scan line. The non-black color printheads 34, 36, 38 are mechanically adjusted using the respective fixed sensors 50 located on each end of the scan line until the skew of the printhead relative to the black photoconductive drum datum 56 is:

$$S_b=(Y_{2f}-Y_{1f})=2*S_v.$$

The alignment fixture processing/feedback unit 42 presents the operator with a display which shows where the desired laser scan beam should be for the required skew, $S_b=2*S_v$, and where the beam is currently located. This is a real time presentation to allow the operator to make the appropriate interactive skew adjustment and then tighten the screws to mount the printhead in the proper position. A fine adjustment may also be made after the printhead coarse adjustment and tie down has been completed. This skew adjustment is made for each color sequentially.

Raster image processor 66 generates a second special page to turn on a constant laser scan line (100% duty cycle) which starts at the first PEL location at the start-of-scan and stops at the last PEL location at the end-of-scan, corresponding to a nominal 215.9 mm location. These actual values can be changed if advantageous to the alignment process.

Fixed sensors 50 can be disposed along the lengths of the photoconductive drums at respective locations corresponding to desired side printing margins. The alignment fixture processing/feedback unit 42 determines from the start-of-scan fixed sensor 50 whether the laser scan beam is completely off sensor 50, extends completely across sensor 50, or begins on sensor 50. Based upon this information, the fixture processing/feedback unit 42 determines whether the first PEL of the scan beam is beyond the desired target, short of the desired target, or on the desired target. Processing/feedback unit 42 then commands raster image processor 66 to either decrease or increase the number of counts that occur after the horizontal synchronization signal and before the start-of-scan. The number of counts is decreased in order to pull the first PEL back onto sensor 50 or, if the first PEL is on sensor 50 but beyond the target, to move the first PEL backward towards the target on sensor 50. The number of counts is increased in order to push the first PEL onto sensor 50, or, if the first PEL is on sensor 50 but short of the target, to move the first PEL forward towards the target on sensor 50.

Based upon the alignment fixture processing/feedback unit command, raster image processor 66 increases or decreases the number of counts dynamically down the page. Once the first PEL of a particular color laser scan line is in the correct position on the start-of-scan end sensor 50, processing/feedback unit 42 informs raster image processor 66. Raster image processor 66 then stops increasing or decreasing the number of counts and stores that count value in printer NVRAM 46 as the correct starting margin value Ns. This process is carried out simultaneously for all four colors.

Next, alignment fixture processing/feedback unit 42 determines, from the end-of-scan fixed sensor 50, whether the laser scan beam is totally off sensor 50, extends completely across sensor 50, or, if the last PEL of the scan beam is on sensor 50, whether the last PEL is short of the desired target or beyond the desired target.

Based upon these data, processing/feedback unit 42 then commands raster image processor 66 to either increase the number of counts that occur after the horizontal synchronization signal and before the start-of-scan in order to push the end-of-scan PEL onto sensor 50, decrease the number of counts in order to pull the end-of-scan PEL back onto sensor 50, or increase or decrease the number of counts based upon the location of the end-of-scan PEL on sensor 50 relative to the desired target (increase if short of the target, decrease if beyond the target).

Based upon the alignment fixture processing/feedback unit command, raster image processor 66 decreases or increases the number of counts dynamically down the page. Once the last PEL of a particular color laser scan line is in the correct position on the end-of-scan end sensor 50, processing/feedback unit 42 informs raster image processor 66. Raster image processor 66 then stops increasing or decreasing the number of counts. Raster image processor 66 then uses this count value Ne and the count value that was stored in NVRAM 46 as the starting margin count value Ns to calculate how many PEL slices are to be inserted or deleted from the respective scan line. The number inserted, Ni, is calculated as: Ni=Ne−Ns. Because Ne and Ns are measured in clock pulses which are PEL slices, Ni is the number of PEL slices to be added if it is positive, and deleted if it is negative. Raster image processor 66 then stores that Ni value in printer NVRAM 46 as the correct starting PEL slice insertion value for that color. This process is carried out simultaneously for all four colors.

In another embodiment, the black line length is left unchanged from its initial value, and all the non-black color line lengths are adjusted to be equal to the length of the black line, rather than to the nominal 215.9 mm line length. The exposure to adjustment fixture 10 is that the black line length might be such that the end-of-scan PEL does not land on sensor 50 in the adjustment fixture. Thus, a larger sensor 50 is required in order to insure that the location of the last PEL is always sensed.

Next, the alignment fixture processing/feedback unit 42 uses the fixed sensors 50 at both ends of all four colors to determine the process direction displacement $Y_{1f}$ of the skew-adjusted laser beam from the nominal target at the start-of-scan end and the displacement $Y_{2f}$ in the process direction from the nominal target at the end-of-scan end for each color. Likewise, the alignment fixture processing/feedback unit 42 determines the corrected process direction displacement $Y'_{1v}$ and $Y'_{2v}$ of the skew adjusted laser beam from the nominal target at each end of the V-block aligned sensors 58 for each color.

Assuming that each photoconductive drum 22, 24, 26, 28 has the same diameter and is rotating at the same constant angular velocity, and that transfer belt 30 passes under black photoconductive drum 22 last, each color will image on transfer belt 30 relative to the nominal spacing between the black photoconductive drum datum 56 and that color's nominal spacing as described by the following relationship:

$$Y_{vfi}=(Y_{1f}+Y_{2f})_i/2-(Y'_{1v}+Y'_{2v})_i$$

where "i" represents the $i^{th}$ color image plane.

In the case of black photoconductive drum 22, the procedure is to align the black laser beam parallel with the black photoconductive drum V-block axis, so the equation for the process direction location of the black laser beam relative to the reference black photoconductive drum axis datum 56 is:

$$Y_{vfK}=(Y_{1f}+Y_{2f})_K/2$$

The alignment fixture processing/feedback unit 42 calculates the measured drum-to-drum spacing $Y_{Di}$ for the $i^{th}$ color using the nominal drum-to-drum spacing $Y_{NDi}$ corrected by the measured distance $Y_{vfi}$ from the sensor nominal target and the laser beam off-set $Y_{vfK}$ of the black photoconductive drum 22 itself:

$$Y_{Di}=Y_{ND}i+Y_{vfi}+Y_{vfK}$$

This drum-to-drum spacing, relative to the black photoconductive drum image, is calculated for all three non-black colors.

The alignment fixture processing/feedback unit 42 passes these $Y_{Di}$ values for each non-black color to the printer raster image processor 66. Based upon this $Y_D$ number, raster image processor 66 determines the appropriate number of whole PEL's (scans) between photoconductive drum image points on transfer belt 30, and the fractional PEL needed to determine the horizontal synchronization phasing between black printhead 32 and that particular non-black color printhead. These values are then stored in NVRAM 46 in printer 12. The printer registration for all four image planes is now complete except for the absolute top-of-page location of the entire four-color image plane. Only this remaining top-of-page synchronization relative to the paper sensor location requires a test page to be run at the final assembly test station to set the proper vertical synchronization value into NVRAM 46 in printer 12.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of aligning a laser printhead in an electrophotographic machine, said method comprising the steps of:
   providing the machine with a plurality of drums;
   scanning a laser beam from the laser printhead across an outside surface of a first of the drums, an intersection of said scanned laser beam and said outside surface of the first drum defining a scan path;
   measuring a first skew of said scan path relative to an axis of the first drum;
   measuring a second skew of said scan path relative to an axis of a second of the drums; and
   adjusting said scan path of the laser beam dependent upon each of said first skew and said second skew.

2. The method of claim 1, wherein said drums comprise fixture drums, said providing step including replacing a plurality of photoconductive drums in the machine with a fixture including said fixture drums.

3. The method of claim 2, wherein said step of measuring the first skew includes providing the first fixture drum with a pair of first sensors, said first sensors being spaced apart along a length of said first fixture drum, each of said first sensors being fixed relative to said first fixture drum, each of said first sensors being configured for sensing a location of the scan path.

4. The method of claim 3, wherein an imaginary line connecting said first sensors is substantially parallel to said axis of said first fixture drum.

5. The method of claim 3, wherein said step of measuring the second skew includes providing said first fixture drum with a pair of second sensors, said second sensors being spaced apart along a length of said first fixture drum axis, each of said second sensors being fixed relative to said second fixture drum, each of said second sensors being configured for sensing a location of the scan path.

6. The method of claim 5, wherein an imaginary line connecting said second sensors is substantially parallel to said axis of said second fixture drum.

7. The method of claim 1, wherein said adjusting step includes the substeps of:
   calculating a desired skew of the laser beam;
   providing an indication of a desired skew target; and
   mechanically adjusting the laser printhead to achieve the desired skew target.

8. The method of claim 7, wherein said indication comprises a visual indication.

9. The method of claim 1, wherein said adjusting step comprises adjusting said scan path such that said second skew is approximately twice as large as a third skew of said axis of said first drum relative to said axis of said second drum.

10. The method of claim 1, wherein said second drum is associated with black toner.

11. A method of aligning a laser printhead in an electrophotographic machine, said method comprising the steps of:
    providing the machine with a plurality of drums;
    providing a first of said drums with a pair of fixed sensors, said fixed sensors being spaced apart along a length of an axis of said first drum, each of said fixed sensors being fixed relative to a second of said drums;
    providing said first drum with a pair of floating sensors, said floating sensors being spaced apart along said length of said first drum axis, each of said floating sensors being fixed relative to said first drum;
    scanning a laser beam from the laser printhead across an outside surface of said first drum, said fixed sensors and said floating sensors, an intersection of said scanned laser beam and said outside surface of said first drum defining a scan path;
    measuring a first skew of said scan path relative to said axis of said first drum using said floating sensors;
    measuring a second skew of said scan path relative to an axis of said second drum using said fixed sensors; and
    adjusting said scan path of the laser beam dependent upon each of said first skew and said second skew.

12. The method of claim 11, wherein said drums comprise fixture drums, said step of providing the machine with a plurality of drums including replacing a plurality of photoconductive drums in the machine with a fixture including said fixture drums.

13. The method of claim 12, comprising the further step of removing a plurality of toner cartridges from the electrophotographic machine, said removing step occurring before said providing steps.

14. An apparatus for positioning a laser beam in an electrophotographic machine, said apparatus comprising:
    a plurality of drums, each said drum having an axis;
    a laser printhead configured to scan the laser beam across a first of said drums;
    a pair of fixed sensors spaced apart along a length of said axis of said first drum, said fixed sensors being fixed relative to a second of said drums, said fixed sensors being configured to sense a skew of the laser beam relative to said second drum;

a pair of floating sensors spaced apart along the length of said first drum, said floating sensors being fixed relative to said first drum, said floating sensors being configured to sense a skew of the laser beam relative to said first drum; and a processing/feedback unit in communication with said fixed sensors and with said floating sensors, said processing/feedback unit being configured to:
calculate a desired skew of the laser beam; and
provide an indication of a desired skew target.

15. The apparatus of claim 14, wherein each said floating sensor is adjacent a corresponding said fixed sensor.

16. The apparatus of claim 14, wherein each said floating sensor is disposed at a respective opposite end of said first drum.

17. The apparatus of claim 14, wherein each said fixed sensor is configured to sense the laser beam in each of a scan direction and a process direction.

18. The apparatus of claim 14, further comprising a rigid plate attached to said fixed sensors.

19. The apparatus of claim 14, wherein each said drum includes two opposite ends, said apparatus further comprising a plurality of V-blocks, each of said V-blocks supporting a respective one of said opposite ends of a corresponding said drum, each said floating sensor being aligned with a corresponding said V-block.

20. The apparatus of claim 19, further comprising a standard having a plurality of apertures extending therethrough, said apertures being aligned parallel to said second drum.

21. The apparatus of claim 20, wherein each of said fixed sensors and each of said floating sensors includes a respective dot generated through a corresponding one of said apertures.

22. A method of setting two side printing margins in an electrophotographic machine, said method comprising the steps of:
providing the machine with a drum having a pair of sensors, each said sensor being disposed at a respective location along a length of said drum, each said location corresponding to a desired side printing margin;
scanning a laser beam from a laser printhead across an outside surface of said drum and the sensors, an intersection of said scanned laser beam and said outside surface of said drum defining a scan path having two opposite ends;
determining respective locations of said ends of the scan path relative to corresponding ones of said sensors, said determining step including determining whether the scan path is one of completely off of a corresponding said sensor, extending completely across a corresponding said sensor, and extending partially across a corresponding said sensor; and
adjusting at least one of a starting location of the scan path and a length of the scan path dependent upon said determining step.

23. The method of claim 22, wherein said adjusting step comprises adjusting a starting location of the scan path by changing a number of counts occurring after a horizontal synchronization signal and before a start-of-scan.

24. A method of setting two side printing margins in an electrophotographic machine, said method comprising the steps of:
providing the machine with a drum having a pair of sensors, each said sensor being disposed at a respective location along a length of said drum, each said location corresponding to a desired side printing margin;
scanning a laser beam from a laser printhead across an outside surface of said drum and the sensors, an intersection of said scanned laser beam and said outside surface of said drum defining a scan path having two opposite ends;
determining respective locations of said ends of the scan path relative to corresponding ones of said sensors; and
adjusting a length of the scan path by changing a number of picture element slices in the scan path dependent upon said determining step.

25. A method of calculating a drum-to-drum spacing in an electrophotographic machine, said method comprising the steps of:
providing the machine with a plurality of drums;
providing a first of said drums with at least one first sensor;
scanning a first laser beam from a first laser printhead across an outside surface of said first drum and said at least one first sensor, an intersection of said scanned first laser beam and said outside surface of said first drum defining a first scan path;
determining a location of the first scan path by using said at least one first sensor;
providing a second of said drums with at least one second sensor;
scanning a second laser beam from a second laser printhead across an outside surface of said second drum and said at least one second sensor, an intersection of said scanned second laser beam and said outside surface of said second drum defining a second scan path;
determining a location of the second scan path by using said at least one second sensor; and
calculating a drum-to-drum spacing based at least in part on said location of said first scan path and said location of said second scan path.

26. The method of claim 25, wherein said drum-to-drum spacing comprises a distance between drum image points on an intermediate transfer medium.

27. A method of calculating a drum-to-drum spacing in an electrophotographic machine, said method comprising the steps of:
providing the machine with a plurality of drums;
providing a first of said drums with at least one first sensor;
scanning a first laser beam from a first laser printhead across an outside surface of said first drum and said at least one first sensor, an intersection of said scanned first laser beam and said outside surface of said first drum defining a first scan path;
determining a location of the first scan path by using said at least one first sensor;
providing a second of said drums with at least one second sensor;
scanning a second laser beam from a second laser printhead across an outside surface of said second drum and said at least one second sensor, an intersection of said scanned second laser beam and said outside surface of said second drum defining a second scan path;
determining a location of the second scan path by using said at least one second sensor; and
calculating a drum-to-drum spacing based at least in part on said location of said first scan path and said location of said second scan path, said drum-to-drum spacing being calculated by an equation comprising:

$$Y_{Di}=Y_{ND}i+Y_{vfi}+Y_{vfK}$$

wherein $Y_{Di}$ is the drum-to-drum spacing, $Y_{ND}i$ is a nominal drum-to-drum spacing, $Y_{vfi}$ is a measured distance between said at least one first sensor and a nominal target, and $Y_{vfK}$ is a laser beam offset of said second drum.

28. A method of adjusting an electrophotographic machine, said method comprising the steps of:

providing the machine with a plurality of drums;

providing a first of said drums with at least one first sensor;

scanning a first laser beam from a first laser printhead across an outside surface of said first drum and said at least one first sensor, an intersection of said scanned first laser beam and said outside surface of said first drum defining a first scan path;

determining a location of the first scan path by using said at least one first sensor;

providing a second of said drums with at least one second sensor;

scanning a second laser beam from a second laser printhead across an outside surface of said second drum and said at least one second sensor, an intersection of said scanned second laser beam and said outside surface of said second drum defining a second scan path;

determining a location of the second scan path by using said at least one second sensor;

calculating a drum-to-drum spacing based at least in part on said location of said first scan path and said location of said second scan path; and adjusting an output delay of at least one of said first laser printhead and said second laser printhead dependent upon a result of said calculating step.

29. The method of claim 28, wherein said drum-to-drum spacing comprises a distance between drum image points on an intermediate transfer medium.

30. The method of claim 29, wherein said drum image points are simultaneously and respectively produced by said first laser beam and said second laser beam.

31. A method of adjusting an electrophotographic machine, said method comprising the steps of:

providing the machine with a plurality of drums;

providing a first of said drums with at least one first sensor;

scanning a first laser beam from a first laser printhead across an outside surface of said first drum and said at least one first sensor, an intersection of said scanned first laser beam and said outside surface of said first drum defining a first scan path;

determining a location of the first scan path by using said at least one first sensor;

providing a second of said drums with at least one second sensor;

scanning a second laser beam from a second laser printhead across an outside surface of said second drum and said at least one second sensor, an intersection of said scanned second laser beam and said outside surface of said second drum defining a second scan path;

determining a location of the second scan path by using said at least one second sensor;

calculating a drum-to-drum spacing based at least in part on said location of said first scan path and said location of said second scan path, said drum-to-drum spacing being calculated by an equation comprising:

$$YDi=YNDi+Yvfi+YvfK$$

wherein $YDi$ is the drum-to-drum spacing, $YNDi$ is a nominal drum-to-drum spacing, $Yvfi$ is a measured distance between said at least one first sensor and a nominal target, and $YvfK$ is a laser beam offset of said second drum; and adjusting at least one of a position and an output delay of at least one of said first laser printhead and said second laser printhead dependent upon a result of said calculating step.

32. A method of adjusting an electrophotographic machine, said method comprising the steps of:

providing the machine with a plurality of drums;

providing a first of said drums with at least one first sensor;

scanning a first laser beam from a first laser printhead across an outside surface of said first drum and said at least one first sensor, an intersection of said scanned first laser beam and said outside surface of said first drum defining a first scan path;

determining a location of the first scan path by using said at least one first sensor;

providing a second of said drums with at least one second sensor;

scanning a second laser beam from a second laser printhead across an outside surface of said second drum and said at least one second sensor, an intersection of said scanned second laser beam and said outside surface of said second drum defining a second scan path;

determining a location of the second scan path by using said at least one second sensor; and adjusting at least one of a position and an output delay of at least one of said first laser printhead and said second laser printhead dependent upon said location of said first scan path and said location of said second scan path.

33. A method of adjusting an electrophotographic machine, said method comprising the steps of:

providing the machine with a plurality of drums including a first drum and a second drum;

providing said first drum with at least one first sensor, said at least one first sensor comprising at least one first fixed sensor and at least one floating sensor, said at least one first fixed sensor being fixed relative to said second drum, said at least one floating sensor being fixed relative to said first drum;

scanning a first laser beam from a first laser printhead across an outside surface of said first drum and said at least one first sensor, an intersection of said scanned first laser beam and said outside surface of said first drum defining a first scan path;

determining a location of the first scan path by using said at least one first sensor;

providing said second drum with at least one second sensor, said at least one second sensor comprising at least one second fixed sensor, said at least one second fixed sensor being fixed relative to said second drum;

scanning a second laser beam from a second laser printhead across an outside surface of said second drum and said at least one second sensor, an intersection of said scanned second laser beam and said outside surface of said second drum defining a second scan path;

determining a location of the second scan path by using said at least one second sensor; and adjusting at least one of a position and an output delay of at least one of said first laser printhead and said second laser printhead dependent upon said location of said first scan path and said location of said second scan path.

34. The method of claim 33, wherein said adjusting step includes aligning print images from said first laser printhead and said second laser printhead in a process direction.

35. The method of claim 33, wherein said first determining step is dependent upon a nominal spacing between said first drum and said second drum.

36. The method of claim 35, wherein said first determining step includes ascertaining a distance between said first scan path and said at least one first fixed sensor.

37. The method of claim 36, wherein said first determining step includes ascertaining a distance between said first scan path and said at least one floating sensor.

38. The method of claim 33, wherein said second determining step includes ascertaining a distance between said second scan path and said at least one second fixed sensor.

39. The method of claim 33, wherein said adjusting step includes calculating an appropriate number of scans between drum image points on an intermediate transfer medium.

40. The method of claim 33, wherein said adjusting step includes calculating a fractional picture element needed to establish correct horizontal synchronization phasing between said first printhead and said second printhead.

41. The method of claim 33, wherein said at least one first fixed sensor comprises a pair of first fixed sensors spaced apart along a length of an axis of said first drum, said at least one floating sensor comprises a pair of floating sensors spaced apart along said length of said first drum axis, and said at least one second fixed sensor comprises a pair of second fixed sensors spaced apart along a length of an axis of said second drum.

* * * * *